United States Patent
Knights

(10) Patent No.: US 12,226,692 B2
(45) Date of Patent: Feb. 18, 2025

(54) VIDEOGRAPHER MODE IN ONLINE GAMES

(71) Applicant: Electronic Arts Inc., Redwood City, CA (US)

(72) Inventor: Garrett Knights, North Vancouver (CA)

(73) Assignee: Electronic Arts Inc., Redwood City, CA (US)

(*) Notice: Subject to any disclaimer, the term of this patent is extended or adjusted under 35 U.S.C. 154(b) by 0 days.

(21) Appl. No.: 18/296,811

(22) Filed: Apr. 6, 2023

(65) Prior Publication Data

US 2023/0241497 A1 Aug. 3, 2023

Related U.S. Application Data

(63) Continuation of application No. 17/504,009, filed on Oct. 18, 2021, now Pat. No. 11,638,872.

(51) Int. Cl.
*A63F 13/525* (2014.01)
*A63F 13/798* (2014.01)
*A63F 13/87* (2014.01)

(52) U.S. Cl.
CPC .......... *A63F 13/525* (2014.09); *A63F 13/798* (2014.09); *A63F 13/87* (2014.09)

(58) Field of Classification Search
None
See application file for complete search history.

(56) References Cited

U.S. PATENT DOCUMENTS

| | | | |
|---|---|---|---|
| 5,971,852 A | 10/1999 | Itai et al. | |
| 8,221,238 B1 | 7/2012 | Shaw et al. | |
| 10,874,948 B2 * | 12/2020 | Ryan | G11B 20/10527 |
| 10,898,805 B2 * | 1/2021 | Spencer | A63F 13/5378 |
| 10,997,494 B1 | 5/2021 | Ng et al. | |
| 11,007,436 B2 * | 5/2021 | Spencer | G06T 7/75 |
| 11,325,037 B2 * | 5/2022 | Swann | A63F 13/5375 |
| 2006/0121990 A1 | 6/2006 | O'Kelley, II et al. | |
| 2006/0247055 A1 | 11/2006 | O'Kelley, II et al. | |
| 2006/0287099 A1 | 12/2006 | Shaw et al. | |
| 2007/0064091 A1 | 3/2007 | Park | |
| 2008/0125226 A1 | 5/2008 | Emmerson | |

(Continued)

OTHER PUBLICATIONS

Office Action for U.S. Appl. No. 17/504,009, mailed on Aug. 16, 2022, Knights, "Videographer Mode in Online Games", 10 pages.

*Primary Examiner* — Seng H Lim
(74) *Attorney, Agent, or Firm* — Lee & Hayes, P.C.

(57) ABSTRACT

A online gaming system may provide for a videographer mode in online gaming. The online gaming system may initiate an instance of an online game for players playing the online game in a player mode, establish connections to respective game clients of the players and to a videographer client of a computing device of a videographer, the videographer being a user participating in the online game in a videographer mode differing from the player mode, the videographer mode including capturing gameplay at least one of the players. Then, the online game system may receive player input data from at least one of the players, update a game state of the instance based on the player input data, and output respective game client data to the respective game clients and videographer client data the videographer client.

20 Claims, 7 Drawing Sheets

(56) References Cited

U.S. PATENT DOCUMENTS

| | | | |
|---|---|---|---|
| 2011/0028207 A1* | 2/2011 | Gagner | G07F 17/32 |
| | | | 463/43 |
| 2014/0038708 A1 | 2/2014 | Davison et al. | |
| 2015/0343313 A1 | 12/2015 | Kaleta et al. | |
| 2016/0193530 A1 | 7/2016 | Parker et al. | |
| 2017/0134825 A1* | 5/2017 | Tian | H04N 21/816 |
| 2017/0282075 A1* | 10/2017 | Michot | A63F 13/86 |
| 2018/0096519 A1* | 4/2018 | Tokubo | A63F 13/56 |
| 2019/0262726 A1* | 8/2019 | Spencer | A63F 13/497 |
| 2021/0354036 A1* | 11/2021 | Swann | A63F 13/5258 |
| 2022/0233953 A1 | 7/2022 | Labate | |
| 2023/0066209 A1* | 3/2023 | Greff | A63F 13/215 |
| 2023/0117046 A1 | 4/2023 | Knights | |

* cited by examiner

| USER | VIDEOGRAPHER REPUTATION SCORE | ONLINE? |
|---|---|---|
| USER A | 80 | YES |
| USER B | 62 | YES |
| USER C | 48 | NO |
| USER D | 80 | NO |
| USER E | 71 | YES |
| USER F | 54 | YES |
| USER G | 88 | NO |
| USER H | 87 | YES |
| USER I | 52 | YES |

FIG. 4

VIDEOGRAPHER MODE IN ONLINE GAMES

CROSS-REFERENCE TO RELATED APPLICATION

This application is a continuation of and claims priority to U.S. application Ser. No. 17/504,009, filed on Oct. 18, 2021 and entitled "VIDEOGRAPHER MODE IN ONLINE GAMES," the entirety of which is incorporated herein by reference.

BACKGROUND

Online gaming allows for players to play a variety of electronic and/or video games with each other via network connectivity, such as via the Internet. With eSports and general game spectating, games are becoming more than just a playing experience. Frustration may arise due to a lack of ways games can be experienced.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 4 illustrates a chart of an example set of videographer reputation scores that may be usable for matchmaking videographers to players or teams in online gaming, in accordance with example embodiments of the disclosure.

DETAILED DESCRIPTION

Figure 1:
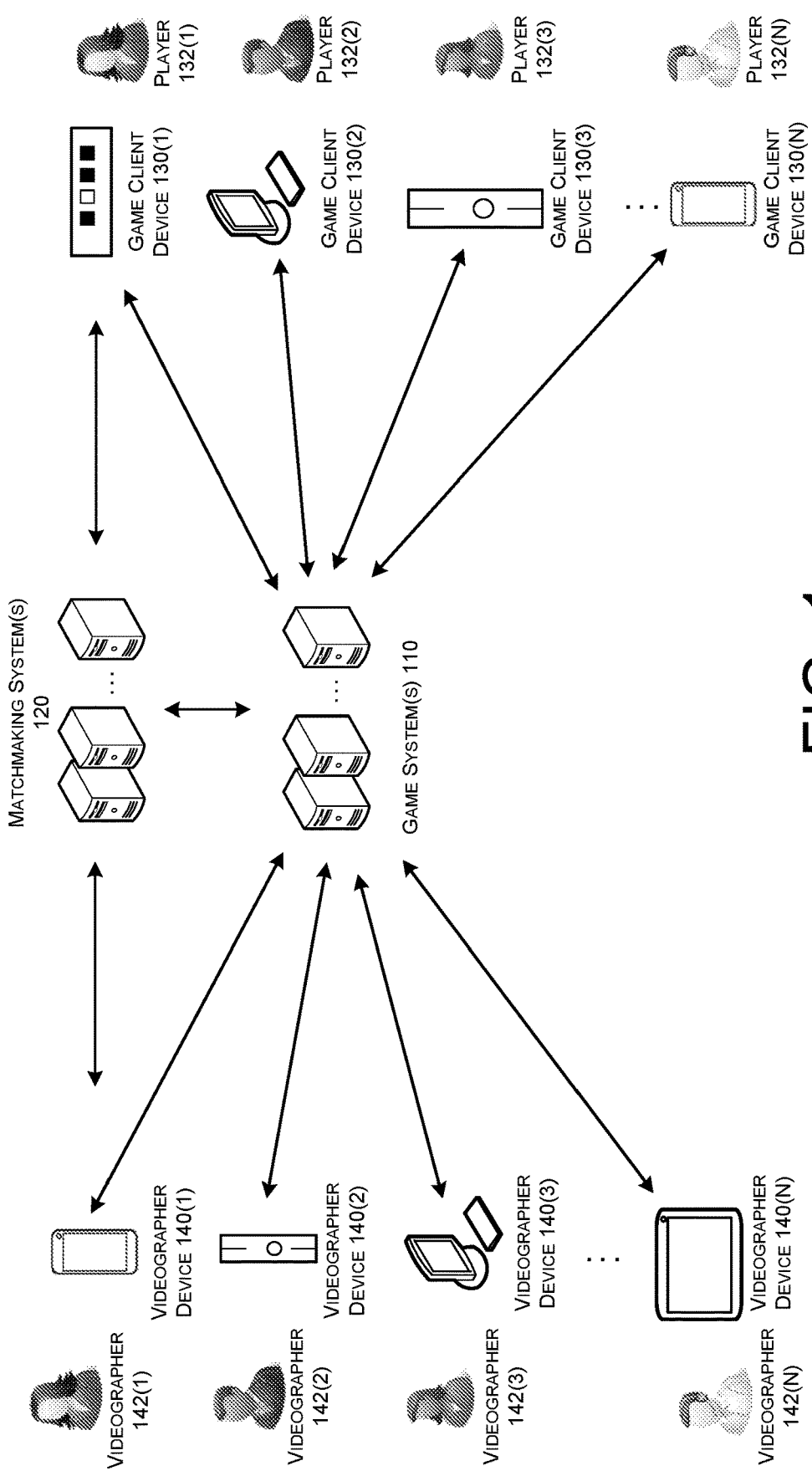
FIG. 1 illustrates a schematic diagram of an example environment with gaming system(s) that may provide a videographer mode in online gaming, in accordance with example embodiments of the disclosure.

Example embodiments of this disclosure describe methods, apparatuses, computer-readable media, and system(s) for providing a videographer mode or role in online gaming. More particularly, example methods, apparatuses, computer-readable media, and system(s) according to this disclosure may allow for one or more users to participate in an online game in a videographer mode that is separate from a player mode of players of the online game. For example, a user participating in videographer mode (also referred to hereinafter as a videographer) may capture the gameplay of one or more of the players (e.g., as images or videos).

In some examples, the videographer mode may provide a videographer user interface (UI) that is different from the player user interface utilized by player of the online game. In some examples, the videographer UI may be provided via a mobile computing device, such as a cellular phone, tablet, or other computing device including a touch screen and/or gyroscopic or inertia-based inputs or sensors of the computing device. The videographer UI may operate to tilt and pan a camera perspective based on gyroscopic or inertia-based sensors. The videographer UI may further provide touch screen input controls that may allow the videographer to change a relative location of the camera perspective.

In some examples, a location of the camera perspective may be attached to a player of the online game. For example, the camera perspective of the videographer may be movable in an orbit around the player using the videographer UI. In addition, or alternatively, the location of the camera perspective may be freely movable, with or without regard to the relative location of players of the online game.

In some examples, a player of the online game may provide authorization or an invitation to the videographer before the videographer is able to capture the gameplay of the player. For example, a player may provide a link or a message to a videographer inviting the videographer to capture the gameplay of the player. In addition, or alternatively, the videographer may send a request to the player for authorization to capture the gameplay of the player or may receive authorization to capture the gameplay of the player based on a social media relationship between the videographer and player (e.g., a friend relationship on a social media platform). In some examples, the camera perspective of a videographer may be attached to a player that authorized or invited the videographer to capture the gameplay of the player. In some such examples, limitations or filters may be applied to capturing gameplay of players other than the authorizing player.

In addition, or alternatively, in some examples, the game systems according to this disclosure may provide a matchmaking functionality between players and videographers. For example, in a team sports-based online game, while matchmaking teams for a match, the game system may further match a videographer to capture gameplay of the teams. As will be discussed further below, in some examples, the game system may include a ranking, ladder, or other reputation or skill determination functionality (hereinafter reputation score) for videographers. In such examples, matchmaking videographers to teams of a match may be based on skill scores or similar scores of the teams and reputation scores of the videographers. Matching between videographer reputation scores and team skill scores may be performed in various manners. In some examples, the game system may rank players into tiers based on various metrics including skill scores. The game system may determine a match tier based on the average skill score of the players in the match or based on the average tier of the players. The game system may include a mapping of reputation scores to a similar tier system for videographers. As such, videographers may be matched to teams with a corresponding tier. In another example, the average skill scores of the players may be mapped compared to the reputation score of the videographer via a transform or comparison formula.

In some examples, the reputation score of the videographers may be based on subjective measures such as player feedback or ratings, objective measures (e.g., completion of videographer tasks assigned by the game) or official scoring (e.g., scoring in managed competitions hosted by the game system). Further, in online games that include competitions between players (e.g., tournaments or ladder matches), the reputation score of videographers may be utilized to determine one or more videographers that may cover matches. For example, matches between highly ranked teams may include a limited number of videographer slots, which may be awarded or matched to videographers with highly ranked reputation scores. In some examples, other users may be restricted from, or limitations may be applied to, capturing video and images of the matches and/or the images and videos captured by the matched videographers may be utilized by the host of the competition as official media. By providing access to higher ranked matches to higher ranked videographers, the videographer mode may add a meaningful appeal and draw to the online game to users outside the core audience of the online game.

In addition, or alternatively, in some examples, the game systems according to this disclosure may provide for in-game interactions between players and videographers. For example, an online skateboard game may include a virtual space such as a virtual skate park in which players of the online skateboard game play. In such an example, the online skateboard game may further provide for a presence of videographers in the virtual space such that videographers may approach players and interact. For example, the videographer may discuss the gameplay of the player and discuss capturing additional gameplay for the player. Such interactions may mimic real world interactions between skateboarders and videographers, thereby providing additional immersion for players and videographers.

The videographer mode provided by examples according to this disclosure may provide a different or additional level of engagement in online games by allowing a user to take on a role dedicated to capturing the gameplay of another. The videographer role may appeal to more to users other than the core audience of the game.

As described in further detailed below, the systems and methods described herein are presented for exemplary and illustrative purposes; they are not indicative of applicant's product or implementation plans. Moreover, it should be understood that any reference herein to the use of player or user data would be in compliance with privacy policies that respect players' privacy, and in accordance with player privacy settings or preferences.

Certain implementations and embodiments of the disclosure will now be described more fully below with reference to the accompanying figures, in which various aspects are shown. However, the various aspects may be implemented in many different forms and should not be construed as limited to the implementations set forth herein. For example, some examples provided herein relate to sport, fighting or shooting games. Implementations are not limited to the example genres. It will be appreciated that the disclosure encompasses variations of the embodiments, as described herein. Like numbers refer to like elements throughout.

FIG. 1 illustrates a schematic diagram of an example environment 100 with game system(s) 110, matchmaking system(s) 120, game client device(s) 130, and videographer device(s) 140 that may provide a videographer mode in online gaming, in accordance with example embodiments of the disclosure.

The example environment 100 may include one or more player(s) 132(1), 132(2), 132(3), . . . 132(N), hereinafter referred to individually or collectively as player(s) 132, who may interact with respective game client device(s) 130(1), 130(2), 130(3), . . . 130(N), hereinafter referred to individually or collectively as game client device(s) 130 via respective input device(s).

The game client device(s) 130 may receive game state information from the one or more game system(s) 110 that may host the online game played by the player(s) 132 of environment 100. The game state information may be received repeatedly and/or continuously and/or as events of the online game transpire. The game state information may be based at least in part on the interactions that each of the player(s) 132 have in response to events of the online game hosted by the game system(s) 110.

The game client device(s) 130 may be configured to render content associated with the online game to respective player(s) 132 based at least on the game state information. More particularly, the game client device(s) 130 may use the most recent game state information to render current events of the online game as content. This content may include video, audio, haptic, combinations thereof, or the like content components.

As events transpire in the online game, the game system(s) 110 may update game state information and send that game state information to the game client device(s) 130. For example, if the player(s) 132 are playing an online soccer game, and the player 132 playing one of the goalies moves in a particular direction, then that movement and/or goalie location may be represented in the game state information that may be sent to each of the game client device(s) 130 for rendering the event of the goalie moving in the particular direction. In this way, the content of the online game is repeatedly updated throughout game play. Further, the game state information sent to individual game client device(s) 130 may be a subset or derivative of the full game state maintained at the game system(s) 110. For example, in a team deathmatch game, the game state information provided to a game client device 130 of a player may be a subset or derivative of the full game state generated based on the location of the player in the game simulation.

When the game client device(s) 130 receive the game state information from the game system(s) 110, a game client device 130 may render updated content associated with the online game to its respective player 132. This updated content may embody events that may have transpired since the previous state of the game (e.g., the movement of the goalie).

The game client device(s) 130 may accept input from respective player(s) 132 via respective input device(s). The input from the player(s) 132 may be responsive to events in the online game. For example, in an online basketball game, if a player 132 sees an event in the rendered content, such as an opposing team's guard blocking the point, the player 132 may use his/her input device to try to shoot a three-pointer. The intended action by the player 132, as captured via his/her input device, may be received by the game client device 130 and sent to the game system(s) 110.

The game client device(s) 130 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 130 may execute programs thereon to interact with the game system(s) 110 and render game content based at least in part on game state information received from the game system(s) 110. Additionally, the game client device(s) 130 may send indications of player input to the game system(s) 110. Game state information and player input information may be shared between the game client device(s) 130 and the game system(s) 110 using any suitable mechanism, such as application program interfaces (APIs).

The game system(s) 110 may receive inputs from various player(s) 132 and update the state of the online game based thereon. As the state of the online game is updated, the state may be sent to the game client device(s) 130 for rendering online game content to player(s) 132. In this way, the game system(s) 110 may host the online game.

The example environment 100 may further include matchmaking system(s) 120 to match player(s) 132 who wish to play the same game and/or game mode with each other and to provide a platform for communication between the player(s) 132 playing online games (e.g., the same game and/or different games). The matchmaking system(s) 120 may receive an indication from the game system(s) 110 of player(s) 132 who wish to play an online game.

The matchmaking system(s) 120 may attempt matchmaking between player(s) 132. The matchmaking system(s) 120 may access information about the player(s) 132 who wish to play a particular online game, such as from a player datastore. A user account for each of the player(s) 132 may associate various information about the respective player(s) 132 and may be stored in the player datastore and accessed by the matchmaking system(s) 120.

Player(s) 132 may be matched according to one or more metrics associated with the player(s) 132 such as skill at a particular game. In addition to or alternatively to skill scores, player(s) 132 may be matched on a variety of other factors. Some example matchmaking factors may be related to behavior in addition to skill and may include a player's playstyle. For example, when matching player(s) 132 as a team for a team deathmatch, the matchmaking system(s) 120 may favor matching player(s) 132 that exhibit similar levels of aggression or a mix of levels of aggression. This may alleviate the frustration experienced by players when deathmatch teams split up due to different players utilizing different tactics. Splitting a deathmatch team into different groups using different tactics can often result in a loss to an opposing team operating as a single unit with a shared tactical approach. The aspects of players' playstyle utilized for different genres or different individual games may vary from example to example.

Some other example matchmaking factors may be character or setup related such as character class, team choice, position or role preference, and so on. For example, when matching player(s) 132 for an online roleplaying game, the matchmaking system(s) 120 may consider the character classes of the player(s) 132. Other matchmaking factors may be related to teammates or teams of the player(s) 132. In an example, the matchmaking may match a player 132 to other players the player 132 plays with regularly.

Having matched the player(s) 132, the matchmaking system(s) 120 may instruct generation of instance(s) of the online game(s) for the match(es). More particularly, the matchmaking system(s) 120 may request the game system(s) 110 instantiate an online game between the matched player(s) 132. For example, the matchmaking system(s) 120 may provide connection information for the game client device(s) 130 to the game system(s) 110 for instantiation of an instance of the online game between the matched player(s) 132. As discussed herein, instances and matches of an online game may be used interchangeably and may refer to a shared gameplay environment in which matched players play in the online game, whether a single map, multiple connected maps, or a gameplay world. In some examples, a server may host the match or instance of the game for the matched players.

As a player 132 engages in additional gameplay, the gaming system(s) 110 may provide the matchmaking system(s) 120 with some or all of the game state information. The matchmaking system(s) 120 may store the game state information or data derived from the game state information. In this manner, behavior data and/or gameplay history for the player 132 may remain up-to-date, even if or as the player's behaviors and playstyle evolve over time.

As mentioned above, the matchmaking system(s) 120 may further provide a platform for communication between the player(s) 132 playing online games (e.g., the same game and/or different games). Depending on the implementation, the matchmaking system(s) 120 may provide a social platform in which player(s) 132 may utilize friends list, communities and/or groups, and other connections to establish relationships with other player(s) 132. The matchmaking system(s) 120 may also provide direct messaging, group messaging, public messaging, chat, and/or other communications functionality to allow player(s) 132 to communicate via the social platform.

In addition, the matchmaking system(s) 120 (or the game system(s) 110) may include in-match communications functionality that may allow player(s) 132 to communicate with other player(s) 132 while in matches or instances of the online game.

The example environment 100 may include one or more videographers(s) 142(1), 142(2), 142(3), ... 142(N), hereinafter referred to individually or collectively as videographers (s) 142, who may interact with respective videographers device(s) 140(1), 140(2), 140(3), ... 140(N), hereinafter referred to individually or collectively as videographers device(s) 140 via respective input device(s).

Videographer device(s) 140 may receive game state information from the game system(s) 110 and operate to allow the videographer(s) 142 to capture the gameplay of player(s) of the online game. In general, videographer device(s) 140 may include a videographer client that is capable of rendering a view for the videographer based on the game state information and/or videographer input to a videographer UI provided by the videographer device(s) 140. In addition or alternatively, in some examples, the videographer device(s) 140 may include a streaming media player that is capable all receiving and presenting to a videographer view rendered at the game system(s) 110 as a media stream and may provide videographer input to the game system(s) 110.

The videographer device(s) 140 may receive game state information from the game system(s) 110 in a similar manner to that discussed above for the game client device(s) 130 receiving game state information from the game system(s) 110. The game state information may be received repeatedly and/or continuously and/or as events of the online game transpire.

A videographer client operating on the videographer device(s) 140 may be configured to render content associated with the online game to the respective videographer(s) 142 based at least on the game state information. More particularly, the videographer device(s) 140 may use the most recent game state information to render current events of the online game as content. This content may include video, audio, haptic, combinations thereof, or the like content components.

As events transpire in the online game, the videographer device(s) 130 may receive updated game state information from the game system(s) 110. For example, if the videographer(s) 142 are capturing gameplay of players of an online soccer game, and a player playing one of the goalies moves in a particular direction, then that movement and/or goalie location may be represented in the game state information that may be sent to each of the videographer device(s) 140 for rendering the event of the goalie moving in the particular direction. In this way, the content of the online game is repeatedly updated throughout game play. Further, the game state information sent to individual videographer device(s) 140 may be a subset or derivative of the full game state maintained by the game system(s) 110.

When the videographer device(s) 140 receive the game state information from the game system(s) 110, a videographer device 140 may render updated content associated with the online game to its respective videographer 142. This updated content may embody events that may have transpired since the previous state of the game (e.g., the movement of the goalie).

The videographer device(s) 140 may accept input from respective videographer(s) 142 via respective input device(s). The input from a videographer 142 may relate to the perspective or rendered view of the videographer and/or be responsive to events in the online game. For example, in an online basketball game, if a videographer 142 sees an event in the rendered content, such as a player trying to shoot a three-pointer, the videographer 142 may desire to move the videographer's viewpoint back to allow the videographer to see and/or capture the player and the goal. The intended change in viewpoint from the videographer 142, as captured via his/her input device, may be received by the videographer device 140 and utilized by the videographer device to change the view being rendered in accordance with the videographer input. In some examples, the videographer device 140 may send the change in the videographer's view to the game system(s) 110 to allow the game system(s) 110 provide appropriate game state information for the videographer.

The videographer device(s) 140 may provide a videographer UI to videographer(s) 142. In some examples, the videographer user interface (UI) that may be different from the player user interface utilized by the players 132 of the online game. In some examples, the videographer UI may be provided via a mobile computing device, such as a cellular phone, tablet, or other computing device including a touch screen and/or gyroscopic or inertia-based inputs or sensors. The videographer UI may operate to tilt and pan a camera perspective based on gyroscopic or inertia-based sensors. The videographer UI may further provide touch screen input controls that may allow the videographer to change a relative location of the camera perspective. Additional details of controlling the camera perspective via an example videographer UI are discussed below with respect to FIG. 2.

In some examples, a location of the camera perspective may be attached to a player of the online game. For example, the camera perspective of the videographer may be movable in an orbit around the player using the videographer UI. In addition, or alternatively, the location of the camera perspective may be freely movable with or without regard to the relative location of players of the online game.

In some examples, the videographer device(s) 140 may be configured to store captured gameplay (e.g., videos or images) locally or in a remote repository associated with the game system(s) 110. In some examples, the captured gameplay (e.g., whether stored locally or remotely) may be accessible by players, other videographers or other entities. For example, a videographer 142 may select particular images, videos or other media as a showcase or demonstration of the videographer's work. In some examples, the captured gameplay may be searchable and/or retrievable by the videographer or other entities by reference to the online game session from which the gameplay was captured.

In addition, the videographer device(s) 140 may be configured to store or buffer the game state information to allow a videographer to rewind gameplay of a player to obtain a better capture of the gameplay. For example, if a videographer does not like the angle at which a particular video of the player was captured, the videographer device 140 may allow the videographer to rewind and recapture the video from another angle.

The videographer device(s) 140 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the videographer device(s) 140 may execute programs (e.g., videographer clients) thereon to interact with the videographer system(s) 130 and render game content based at least in part on game state information received from the videographer system(s) 130. Additionally, the videographer device(s) 140 may send indications of spectator input to the videographer system(s) 130. Game state information and videographer input information may be shared between the videographer device(s) 140 and the videographer system(s) 130 using any suitable mechanism, such as application program interfaces (APIs).

The game system(s) 110 may receive inputs or videographer viewpoints from the videographer device(s) 140 and update the game state information being sent to the videographer device(s) 140 for rendering online game content to videographer(s) 142. In this way, the game system(s) 110 may provide for a videographer mode of the online game for videographer device(s) 140 including a videographer client that may rendering a videographer view from game state information and allow for capturing the gameplay of players of the online game.

The matchmaking system(s) 120 may operate with the game system(s) 110 and videographer device(s) 140 to connect videographer(s) 142 to online game(s) for which the videographer(s) 142 desire to capture gameplay. The matchmaking system(s) 120 may receive an indication from the game system(s) 110 of videographer(s) 142 who wish to participate in videographer mode in the online game.

The matchmaking system(s) 120 may provide an interface for the videographer to find an online game from among online games in progress in the game system(s) 110. In addition, or alternatively, videographer device 140 may provide the matchmaking system(s) 120 with an indication of an online game in which the videographer 142 wishes to participate in videographer mode (e.g., via a link posted or provided by a game player).

Having determined the online game in which the videographer 142 wishes to participate in videographer mode, the matchmaking system(s) 120 may provide connection information for the videographer device(s) 140 to the game system(s) 110 for addition of the videographer 142 to the online game.

In some examples, a player 132 of the online game may provide authorization or an invitation to a videographer 142 before the videographer 142 is able to capture the gameplay of the player 132. For example, a player 132 may provide a link or a message to a videographer 142 inviting the videographer 142 to capture the gameplay of the player 132. In addition, or alternatively, the videographer 142 may send a request to the player 132 for authorization to capture the gameplay of the player 132 or may receive authorization to capture the gameplay of the player 132 based on a social media relationship between the videographer 142 and player 132 (e.g., a friend relationship on a social media platform). In some examples, a camera perspective of a videographer 142 may be attached to a player 132 that authorized or invited the videographer 142 to capture the gameplay of the player 132. In some such examples, limitations or filters may be applied to capturing gameplay of players other than the authorizing player. For example, a blurring effect may be applied to an area of a captured images or video that contains a different player. Similarly, an attempt to begin capture of images or video which does not include the authorizing player, but which does include a different player, may be blocked and an error message may be displayed to the videographer. Many other variations on such limitations and filters would be apparent to one of skill in the art based on this disclosure.

In addition, or alternatively, in some examples, the game system(s) 110 according to this disclosure may provide a matchmaking functionality between players 132 and videographers 142. For example, in a team sports-based online game, while matchmaking teams for a match of the online game, the game system 110 may further match a videographer 142 to capture gameplay of the teams. In some examples, the game system may include a ranking, ladder, or other reputation or skill determination functionality for videographers 142. In such examples, matchmaking videographers 142 to teams of a match may be based on skill scores or similar scores of the teams and reputation scores of the videographers 142. Matching between videographer reputation scores and team skill scores may be performed in various manners. In some examples, the game system may rank players into tiers based on various metrics including skill scores. The game system may determine a match tier based on the average skill score of the players in the match or based on the average tier of the players. The game system may include a mapping of reputation scores to a similar tier system for videographers. As such, videographers may be matched to teams with a corresponding tier. In another example, the average skill scores of the players may be mapped compared to the reputation score of the videographer via a transform or comparison formula.

In some examples, the reputation score of the videographer 142 may be based on subjective measures such as player feedback or ratings, objective measures (e.g., completion of completion of videographer tasks assigned by the game) or official scoring (e.g., scoring in managed competitions hosted by the game system). Further, in online games that include competitions between players 132, the reputation score of videographers 142 may be utilized to determine one or more videographers 142 that may cover matches. For example, matches between highly ranked teams may include a limited number of videographer slots, which may be awarded or matched to videographers 142 with highly ranked reputation scores. In some examples, other users may be restricted from, or limitations may be applied to, capturing video and images of the matches and/or the images and videos captured by the matched videographers may be utilized by the host of the competition as official media. By providing access to higher ranked matches to higher ranked videographers 132, the videographer mode may add a meaningful appeal and draw to the online game to users outside the core audience of the online game.

The matchmaking system(s) 120 and game system(s) 110 may further provide a platform for communication between the videographer(s) 142 and/or player(s) 132 of the online game(s) (e.g., the same game and/or different games). Depending on the implementation, the matchmaking system(s) 120 may provide a social platform in which videographer(s) 142 may utilize friends list, communities and/or groups, and other connections to establish relationships with other videographer(s) 142 and/or player(s) 132. The matchmaking system(s) 120 may also provide direct messaging, group messaging, public messaging, chat, and/or other communications functionality to allow videographer(s) 142 to communicate via the social platform.

In addition, the game system(s) 110 may include in-match communications functionality that may allow videographer(s) 142 to communicate with other videographer(s) 142 and/or player(s) 132 while participating in videographer mode in matches or instances of the online game.

In addition, in some examples, the game system 110 may provide for in-game interactions between players 132 and videographers 142. For example, an online skateboard game may include a virtual space such as a virtual skate park in which players 132 play. In such an example, the online skateboard game may further provide for a presence of videographers 142 in the virtual space such that videographers 142 may approach players 132 and interact. For example, the videographer 142 may discuss the gameplay of the player 132 and discuss capturing additional gameplay for the player 132. Such interactions may mimic real world interactions between skateboarders and videographers, thereby providing additional immersion for players 132 and videographers 142.

Further, in some examples, the game system 110 may allow for videographers to perform actions that may affect the virtual space. For example, in the aforementioned skateboard game, the online game may allow for videographers to make additions or deletions from the space, such as by setting up obstacles and terrain for a player to navigate while the videographer captures the player's gameplay.

Other variations would be apparent based on this disclosure.

Additional details regarding online gaming systems that provide a videographer mode for online games are illustrated in FIGS. 2-7 and discussed below.

Figure 2:
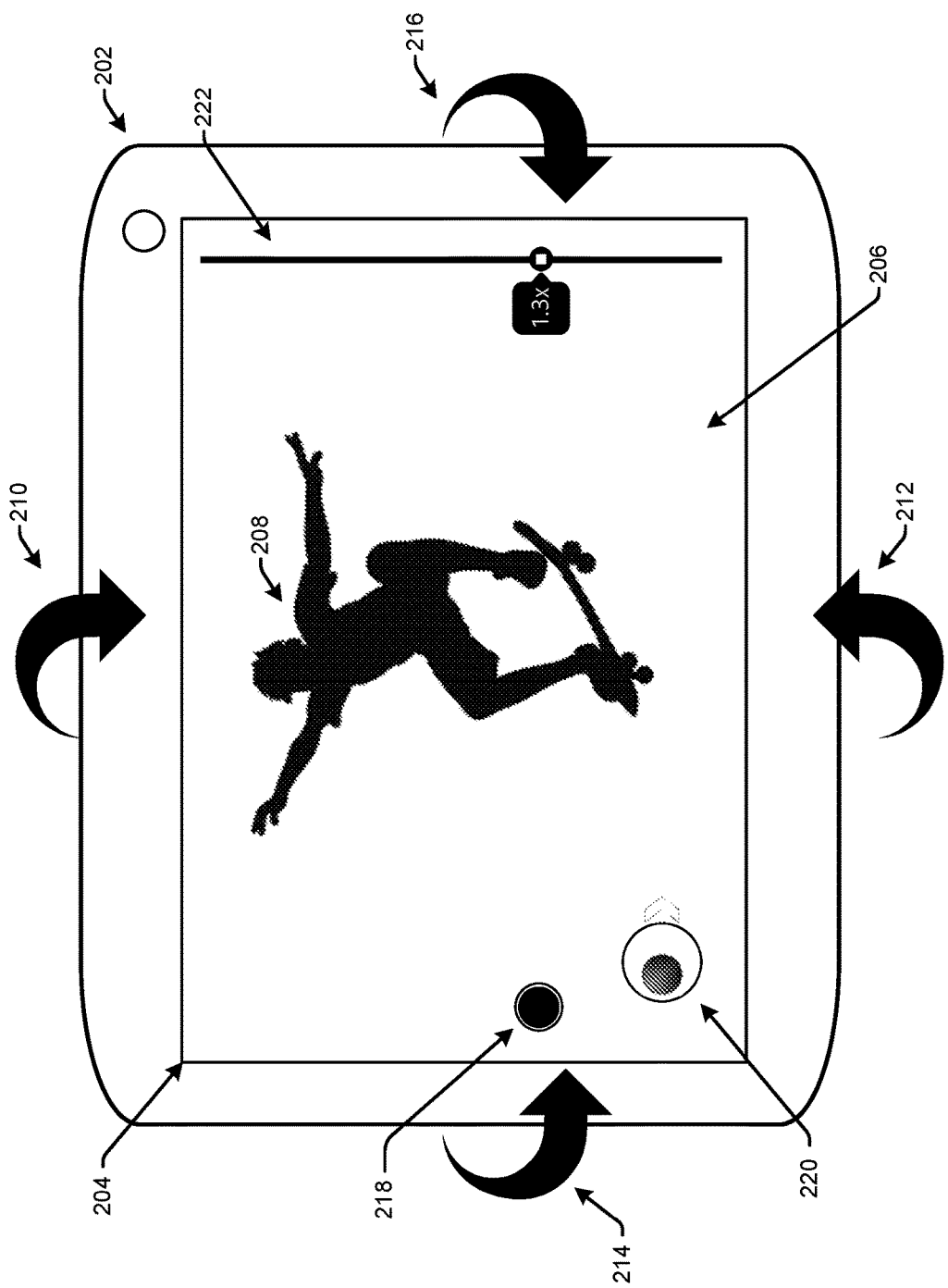
FIG. 2 illustrates an example diagram of a videographer device that may provide a videographer mode for an online game, in accordance with example embodiments of the disclosure.

FIG. 2 illustrates an example diagram 200 of a videographer device 202 that may provide a videographer mode for an online game, in accordance with example embodiments of the disclosure. The example videographer device 202 may include gyroscopic or inertia-based inputs or sensors (not shown) and a touchscreen display 204 via which a videographer UI 206 may be provided to a user. The illustrated videographer device 202 of FIG. 2 may be an example implementation of the videographer device(s) 140 shown in FIG. 1.

In operation, the videographer UI 206 may allow the videographer to capture gameplay of a player or subject 208 as discussed above. In the particular illustrated example, the videographer mode (or active configuration of the videographer mode) may include the location of the camera perspective being attached to a player 208. Specifically, the camera perspective of the videographer may be movable in an orbit around the player using the videographer UI 206.

The videographer device may operate to tilt and pan the camera perspective based on the gyroscopic or inertia-based sensors input. More particularly, in response to sensing the videographer device 202 being tilted toward the user (e.g., motion 210), the camera perspective of the videographer UI 206 may be tilted up. Similarly, in response to sensing the videographer device 202 being tilted away from the user (e.g., motion 212), the camera perspective of the videographer UI 206 may be tilted down. In response to sensing the left side of the videographer device 202 being rotated toward the user (e.g., motion 214), the camera perspective of the videographer UI may be panned left. Similarly, in response to sensing the right side of the videographer device 202 being rotated toward the user (e.g., motion 216), the camera perspective of the videographer UI 206 may be panned right.

The videographer UI 206 may further provide touchscreen input controls that may allow the videographer to operate the videographer device 202 in videographer mode. For example, the videographer may actuate the capture button 218 to trigger the capture of gameplay. Further, the videographer may interact with controls 220 and 222 to change a relative location of the camera perspective. More particularly, the control 220 may operate to allow the location of the camera perspective to be orbited around the subject player 208. As shown, the control 220 is being dragged to the right, such that the location of the camera perspective is being rotated to the right around the player. The control 222 may operate to allow the location of the camera perspective to be moved toward or away from the player 208 by dragging the slider up or down (e.g., to change the orbital distance of around the player 208).

While discussed in the context of the location of the camera perspective being attached to an orbit around a player, examples are not so limited. For example, the videographer UI may be utilized with a free moving camera perspective. More particularly, the control 220 may be utilized to move the camera location up, down, left and right while the control 222 may be utilized to move the camera forward and back.

Figure 3:
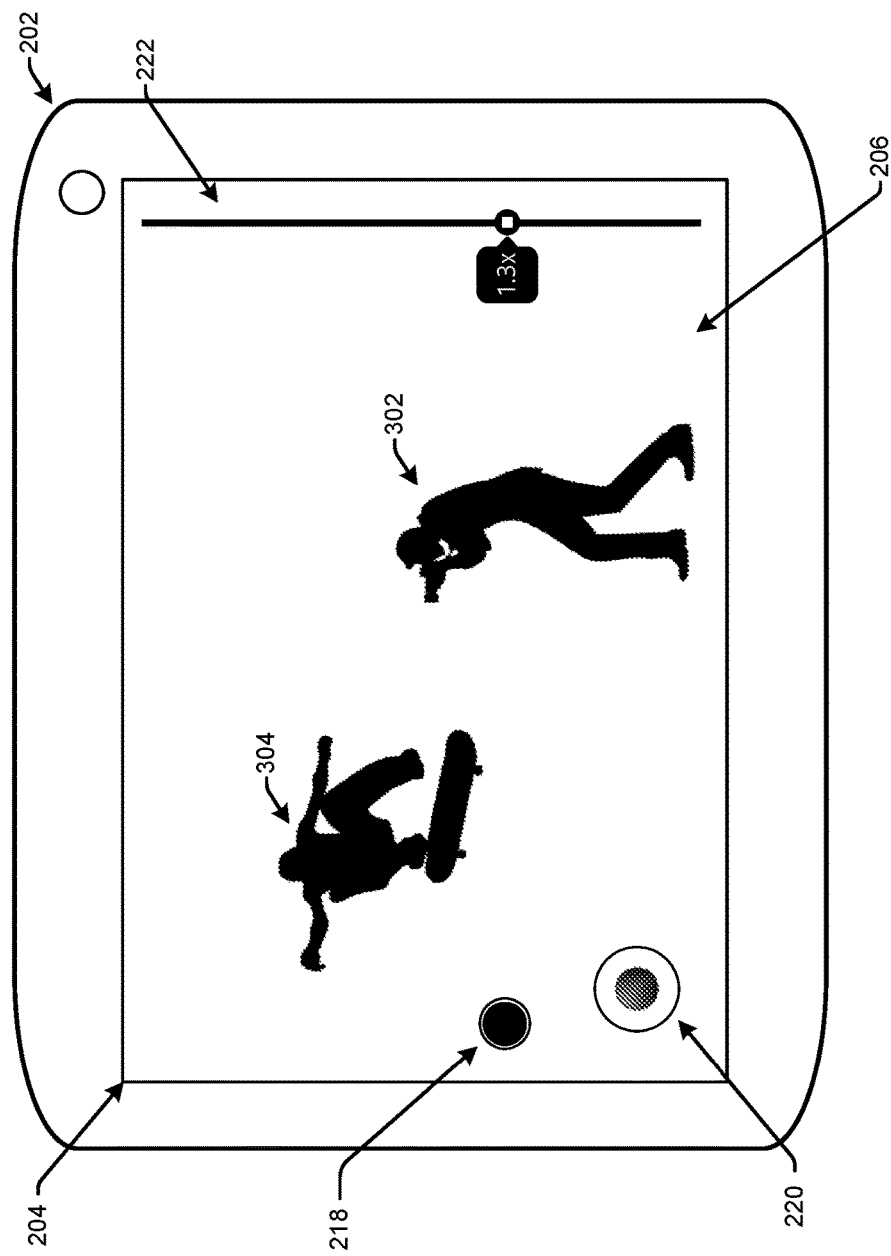
FIG. 3 illustrates an example diagram of a videographer device that may provide a videographer mode for an online game, in accordance with example embodiments of the disclosure.

FIG. 3 illustrates an example diagram 300 of a videographer device that may provide a videographer mode for an online game, in accordance with example embodiments of the disclosure. More particularly, FIG. 3 illustrates the example videographer device 202 for a player-videographer interaction in a virtual environment. For example, the videographer UI may provide for the user to switch from a first-person camera perspective, such as that shown in FIG. 2, to a third person perspective including an avatar 302 for the videographer as well as a representation of the player 304.

As discussed above, the game system 110 may provide for in-game interactions between players 132 and videographers 142. For example, the illustrated in-game interaction may include a virtual space within an online skateboard game such as a virtual skate park in which players 132 play. In such an example, the online skateboard game may further provide for a presence of videographers 142 in the virtual space that is visible to the players such that videographers 142 may approach players 132 and interact. For example, the videographer 142 may discuss the gameplay of the player 132 and discuss capturing additional gameplay for the player 132.

Further, in some examples, the game system may allow for videographers to perform actions that may affect the virtual space. For example, the online game may allow for videographers to set up obstacles and terrain for a player to navigate while the videographer captures the player's gameplay.

FIG. 4 illustrates a chart 400 of an example set of videographer reputation scores that may be usable for matchmaking videographers to players or teams, in accordance with example embodiments of the disclosure.

The chart 400 shows a number of users, such as user A through user I who have corresponding videographer reputation scores as shown. For example, user C may have a videographer reputation score of 48, while user H may have a videographer reputation score of 87. The videographer reputation scores used in this example may be on a 0-100 range, but any suitable range (e.g., 0-1, 0-50, etc.) may be used according to example embodiments of the disclosure. The videographer reputation scores may be determined by the matchmaking system(s) 120 by accessing a datastore of the game system(s) 110 or matchmaking system(s) 120. In example embodiments, the matchmaking system(s) 120, by using a user's identifier, may be able to access the user's videographer reputation score from the datastore.

The chart 400 further shows whether the user is online and/or wishes to be matched for a game as a videographer. For example, user A is online, while user B is not online. In the illustrated example, for ease of illustration, players who are online but do not want to be matched as a videographer are indicated as not online or are not shown.

Based at least in part on the videographer reputation scores for the users, the player(s) 132 and videographer(s) 142 may be combined into different online games. This process may involve finding those players who have respective skill scores that are within a threshold value of each other and further matching videographer(s) who have comparable videographer reputation scores to those players.

Figure 5:
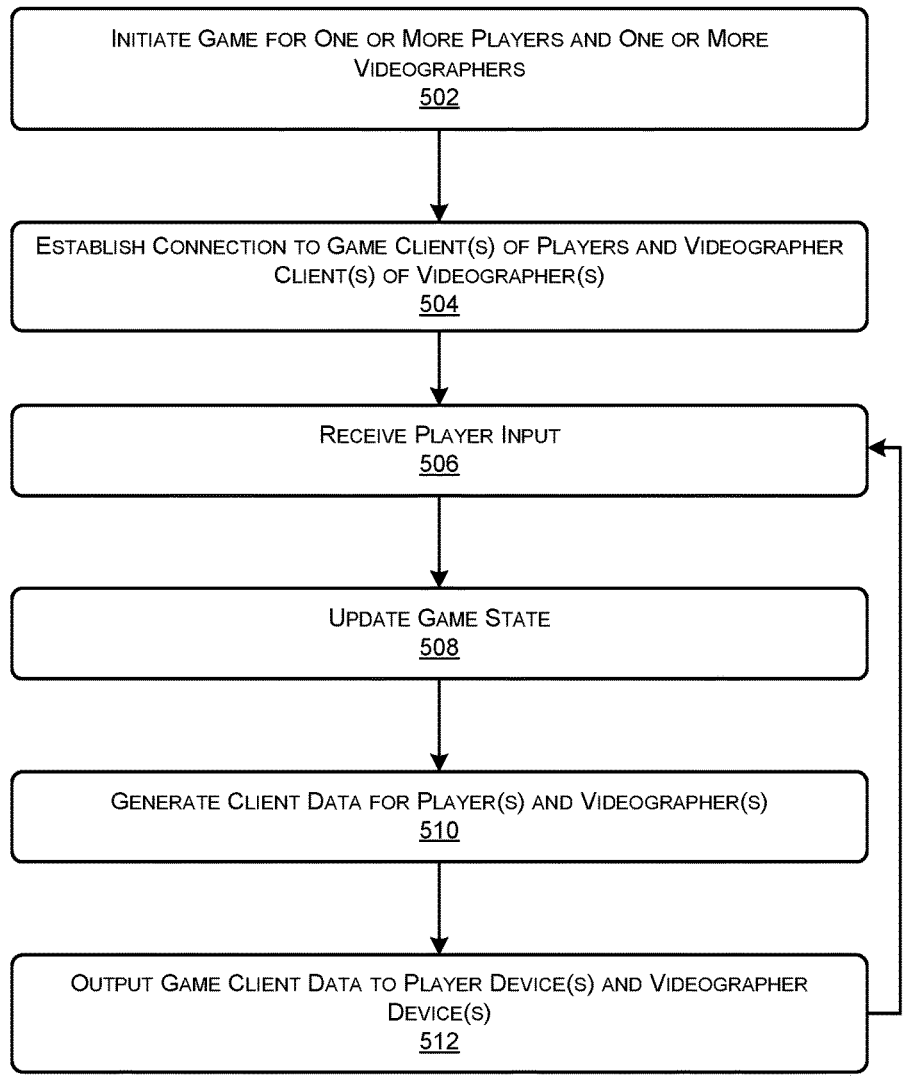
FIG. 5 illustrates an example flow diagram of an example method that may provide a videographer mode in online gaming, in accordance with example embodiments of the disclosure.

FIG. 5 illustrates a flow diagram of an example method 500 that may provide a videographer mode in online gaming, in accordance with example embodiments of the disclosure. The method 500 may be performed by the online gaming system of the environment 100. More particularly, the method 500 may relate to the operations of a game system to initialize and host an online game that provides a videographer mode in online gaming.

At block 502, the online game system may initiate a game for one or more players and one or more videographers. The online game system may establish connections with game clients associated with the one or more players and videographer clients associated with the one or more videographers at 504 to begin the game. In some examples, the connections to the videographer clients may occur before or after the beginning of the game and may be performed for individual videographers as requests are received or for multiple videographers, for example, in batches.

During gameplay, the online game system may receive player input from the one or more players via the player game clients at 506. At 508, the online game system may utilize the player input to update the game state of the online game. The online game system may generate client data for the players and videographers at 510. As mentioned above, in some examples, the client data generated for an individual player may be based on the state of the player in the game (e.g., based on the player's location or other factors). The client data for the players and videographers may be output to the game clients operating on the player devices and videographer clients operating on the videographer devices at 512.

The process illustrated in FIG. 5 may return to 506 and continue during the duration of the online game.

Figure 6:
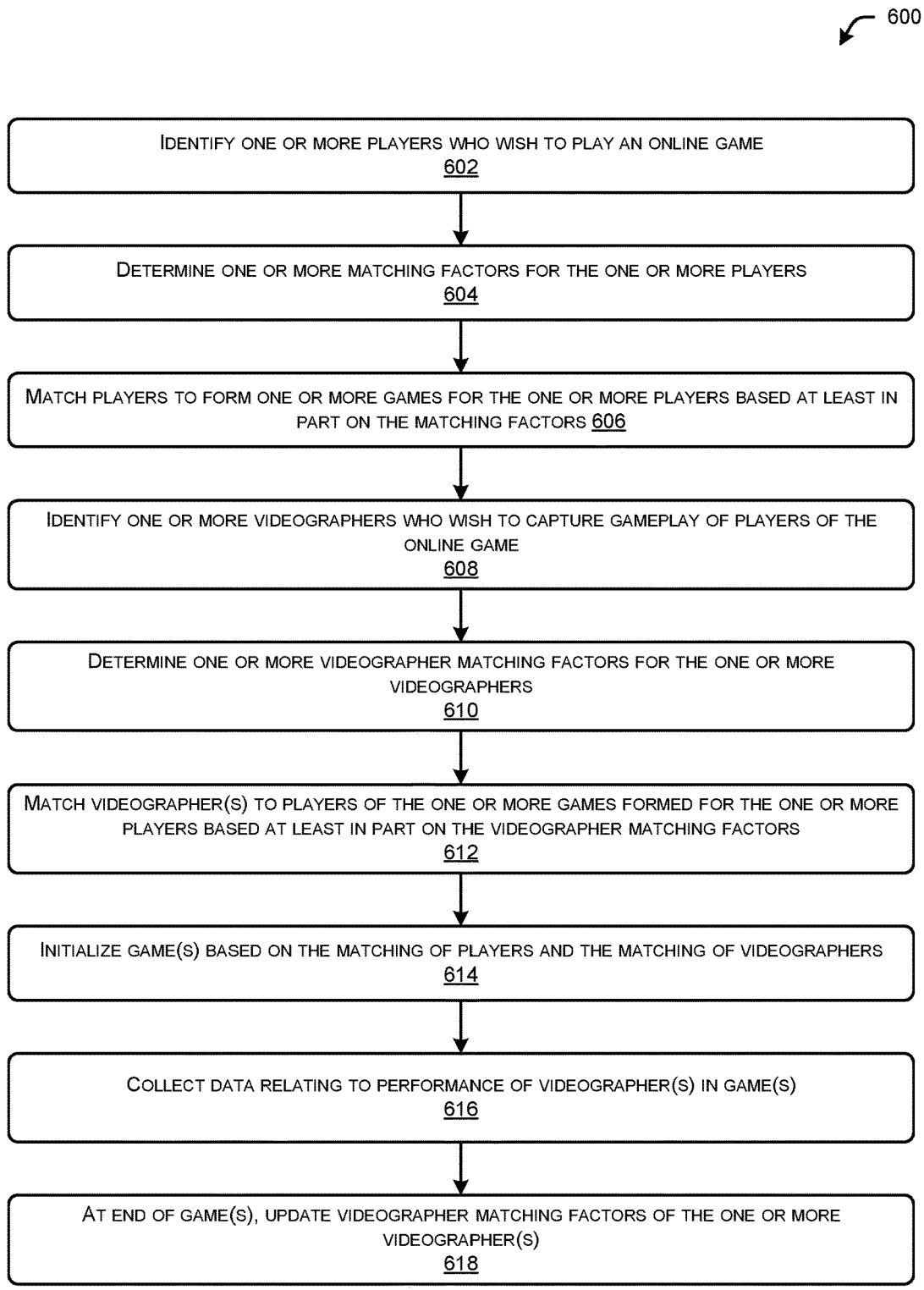
FIG. 6 illustrates a flow diagram of an example method to provide matchmaking for an online game system providing a videographer mode, in accordance with example embodiments of the disclosure.

FIG. 6 illustrates a flow diagram of an example method 600 to provide matchmaking for an online game system providing a videographer mode, in accordance with example embodiments of the disclosure. The method 600 may be performed by the matchmaking system(s) 120, individually or in cooperation with one or more other elements of the environment 100. Method 600 may be performed, for example, based on the details discussed above with regard to FIG. 1.

At block 602, one or more player(s) 132 who wish to play an online game may be identified. The one or more player(s) 122 may be identified by the matchmaking system(s) 120 based at least in part on a message and/or an indication from the game system(s) 110 and/or game client device(s) 130 that the one or more player(s) 132 wish to play the online game. In other cases, the matchmaking system(s) 120 may repeatedly access a shared list and/or database that provides information about players 132 who wish to join different online games.

At block 604, the matchmaking system(s) 120 may determine one or more matching factors for the one or more players 132. For example, a skill score for each of the one or more players 132 may be determined by accessing a player datastore and using a player identifier for each of the players 132 to access the respective skill scores for the player(s) 132. At block 606, the matchmaking system(s) 120 may match players to form one or more games for the one or more players based at least in part on the matching factors.

At block 608, one or more videographer(s) 142 who wish to capture gameplay of players of the online game may be identified. The one or more videographer(s) 142 may be identified by the matchmaking system(s) 120 based at least in part on a message and/or an indication from the game system(s) 110 and/or videographer device(s) 140 that the one or more videographer(s) 142 wish to capture gameplay of players of the online game. In other cases, the matchmaking system(s) 120 may repeatedly access a shared list and/or database that provides information about videographers 142 who wish to join different online games.

At block 610, the matchmaking system(s) 120 may determine one or more videographer matching factors for the one or more videographers 132. For example, a reputation score for each of the one or more videographers 142 may be determined by accessing a user datastore and using a user identifier for each of the videographers 142 to access the respective reputation scores for the videographer(s) 142. At block 612, the matchmaking system(s) 120 may match videographer(s) to players of the one or more games formed for the one or more players based at least in part on the videographer matching factors.

At block 614, the one or more instances of the game(s) may be initialized based on the completed matchups. For example, having matched the player(s) 132 and videographer(s) 142, the matchmaking system(s) 120 may trigger and instruct generation of instance(s) of the online game(s) for the match(es) by one or more of the game system(s) 110, the game client device(s) 130, videographer device(s) 140. For example, the matchmaking system(s) 120 may provide connection information for the game client device(s) 130 of two or more matched players 132 and a videographer device 140 of a videographer 142 to the game system(s) 110 and request the game system(s) 110 instantiate an online game between the two or more matched players 132 and the videographer 142.

The matchmaking system(s) 120 may collect data relating to the performance of the videographer(s) during the one or more instance(s) of the game(s) at 616. As discussed above, the reputation scores of the videographers 142 may be based on subjective measures such as player feedback or ratings, objective measures (e.g., completion of videographer tasks assigned by the game) or official scoring (e.g., scoring in managed competitions hosted by the game system). Such data may be collected during or at the end of the one or more instance(s) of the game(s).

At block 618, at the end of the game(s), the matchmaking system(s) 130 may update the stored videographer matching factors of the one or more videographers based on the collected data.

It should be noted that some of the operations of methods 500-600 may be performed out of the order presented, with additional elements, and/or without some elements. Some of the operations of methods 500-600 may further take place substantially concurrently and, therefore, may conclude in an order different from the order of operations shown above.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 7:
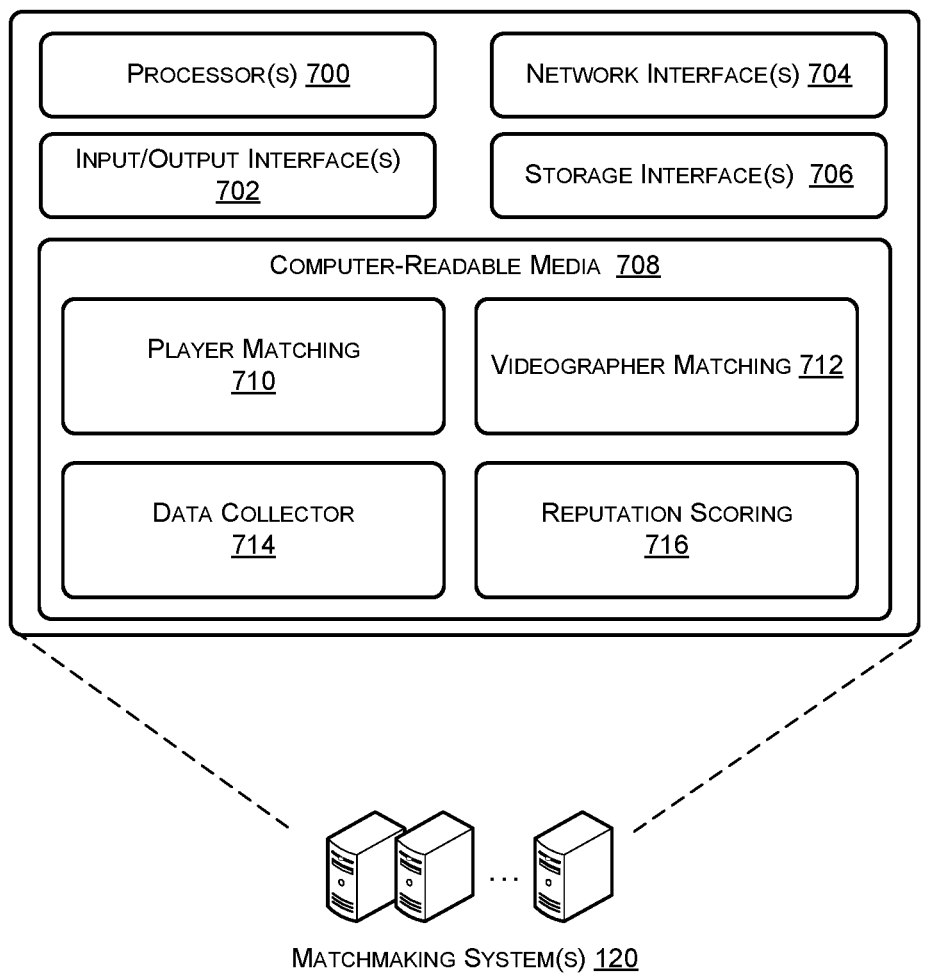
FIG. 7 illustrates a block diagram of example matchmaking system(s) that may provide matchmaking for an online game system including a videographer mode in accordance with example embodiments of the disclosure.

FIG. 7 illustrates a block diagram of example matchmaking system(s) 120 that may provide matchmaking for an online game system including a videographer mode in accordance with examples of the disclosure. The matchmaking system(s) 120 may include one or more processor(s) 700, one or more input/output (I/O) interface(s) 702, one or more network interface(s) 704, one or more storage interface(s) 706, and computer-readable media 708.

In some implementations, the processor(s) 700 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 700 may possess its own local memory, which also may store program modules, program data, and/or one or more operating system(s). The one or more processor(s) 700 may include one or more cores.

The one or more input/output (I/O) interface(s) 702 may enable the matchmaking system(s) 120 to detect interaction with a user and/or other system(s), such as one or more game system(s) 110. The I/O interface(s) 702 may include a combination of hardware, software, and/or firmware and may include software drivers for enabling the operation of any variety of I/O device(s) integrated on the matchmaking system(s) 120 or with which the matchmaking system(s) 120 interacts, such as displays, microphones, speakers, cameras, switches, and any other variety of sensors, or the like.

The network interface(s) 704 may enable the matchmaking system(s) 120 to communicate via the one or more network(s). The network interface(s) 704 may include a combination of hardware, software, and/or firmware and may include software drivers for enabling any variety of protocol-based communications, and any variety of wireline and/or wireless ports/antennas. For example, the network interface(s) 704 may comprise one or more of a cellular radio, a wireless (e.g., IEEE 802.1x-based) interface, a Bluetooth® interface, and the like. In some embodiments, the network interface(s) 704 may include radio frequency (RF) circuitry that allows the matchmaking system(s) 120 to transition between various standards. The network interface(s) 704 may further enable the matchmaking system(s) 120 to communicate over circuit-switch domains and/or packet-switch domains.

The storage interface(s) 706 may enable the processor(s) 700 to interface and exchange data with the computer-readable medium 708, as well as any storage device(s) external to the matchmaking system(s) 120.

The computer-readable media 708 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 708 may be implemented as computer-readable storage media (CRSM), which may be any available physical media accessible by the processor(s) 700 to execute instructions stored on the computer readable media 708. In one basic implementation, CRSM may include RAM and Flash memory. In other implementations, CRSM may include, but is not limited to, ROM, EEPROM, or any other tangible medium which can be used to store the desired information and which can be accessed by the processor(s) 700. The computer-readable media 708 may have an operating system (OS) and/or a variety of suitable applications stored thereon. The OS, when executed by the processor(s) 700 may enable management of hardware and/or software resources of the matchmaking system(s) 120.

Several functional blocks having instruction, data stores, and so forth may be stored within the computer-readable media 708 and configured to execute on the processor(s) 700. The computer readable media 708 may have stored thereon a player matching module 710, a videographer matching module 712, a data collector module 714, and a reputation scoring module 716. It will be appreciated that each of the functional blocks 710-716 may have instructions stored therein that, when executed by the processor(s) 700, may enable various functions pertaining to the operations of the matchmaking system(s) 120.

For example, the player matching module 710 may enable various functions related to the matching players into instances of the online game. The videographer matching module 712 may enable various functions with respect to matching videographers to players, for example, based on reputation scores of the videographers and/or adding videographers to instances of the online game. As mentioned above, examples are not limited to matching videographers based on reputation score such as when a videographer is added to an instance of an online game based on a link provided by a player without matchmaking. The data collector module 714 may enable various functions with respect to collecting data regarding the performance of the videographers in instances of the online game (e.g., subjective or objective data upon which performance of the videographers may be evaluated). The reputation scoring module 716 may enable various functions with respect to determining reputation scores for the videographers based, for example, on data collected by the data collector module 714.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
    one or more processors;
    one or more inertia-based input sensors; and
    one or more computer-readable media, wherein the one or more processors, the one or more inertia-based input sensors and the one or more computer-readable media are communicatively coupled to one another, and wherein the one or more computer- readable media stores computer-executable instructions that, when executed by the one or more processors, cause the one or more processors to:
        connect a first player as a videographer character to a shared virtual gameplay environment of an online game in a videographer mode, the shared virtual gameplay environment of the online game including a plurality of player characters including the videographer character and at least one player character of a second player playing the online game in a player mode differing from the videographer mode, wherein the first player and the at least one player character are matched together, the shared virtual gameplay environment including a virtual space enabling interactions among the plurality of player characters; and
        capture, as the videographer character, one or more of the interactions of the at least one player character among the plurality of player characters in the shared virtual gameplay environment, wherein the one or more of the interactions of the at least one player character are captured from a view associated with the videographer character, wherein the view can be controlled based at least in part on one or more inertia-based inputs received via the one or more inertia-based input sensors during the capture.

2. The system of claim 1, wherein the plurality of player characters includes other videographer characters.

3. The system of claim 1, wherein capturing of the one or more interactions comprises capturing game state information corresponding to at least the one or more interactions.

4. The system of claim 1, wherein the one or more of the interactions include interactions between one or more player characters of the plurality of player characters and one or more virtual objects in the shared virtual gameplay environment.

5. The system of claim 1, wherein a rendering of the shared virtual gameplay environment during the online game includes rendering an avatar of the videographer character.

6. The system of claim 1, wherein the one or more inertia-based inputs received during the capture are based on one or more real-world movements detected by the one or more inertia-based input sensors.

7. The system of claim 1, wherein matching the first player with the at least one player character is based at least in part on a skill level of the at least one player character and a reputation level of the first player.

8. A computer-implemented method comprising:
    connecting a first player as a videographer character to a shared virtual gameplay environment of an online game in a videographer mode, the shared virtual gameplay environment of the online game including a plurality of player characters including the videographer character and at least one player character of a second player playing the online game in a player mode differing from the videographer mode, wherein the first player and the at least one player character are matched together, the shared virtual gameplay environment including a virtual space enabling interactions among the plurality of player characters; and
    capturing, as the videographer character, one or more of the interactions of the at least one player character among the plurality of player characters in the shared virtual gameplay environment, wherein the one or more of the interactions of the at least one player character are captured from a view associated with the videographer character, wherein the view can be controlled based at least in part on one or more inertia-based inputs received via one or more inertia-based input sensors during the capture.

9. The computer-implemented method of claim 8, wherein the plurality of player characters includes other videographer characters.

10. The computer-implemented method of claim 8, wherein capturing of the one or more of the interactions comprises capturing game state information corresponding to at least the one or more of the interactions.

11. The computer-implemented method of claim 8, wherein the one or more of the interactions include interactions between one or more player characters of the plurality of player characters and one or more virtual objects in the shared virtual gameplay environment.

12. The computer-implemented method of claim 8, wherein a rendering of the shared virtual gameplay environment during the online game includes rendering an avatar of the videographer character.

13. The computer-implemented method of claim 12, wherein the one or more inertia-based inputs received during the capture are based on one or more real-world movements detected by the one or more inertia-based input sensors.

14. The computer-implemented method of claim 8, wherein matching the first player with the at least one player character is based at least in part on a skill level of the at least one player character and a reputation level of the first player.

15. A non-transitory computer readable medium storing machine-readable instructions that, when executed by one or more processors, cause the one or more processors to:
- connect a first player as a videographer character to a shared virtual gameplay environment of an online game in a videographer mode, the shared virtual gameplay environment of the online game including a plurality of player characters including the videographer character and at least one player character of a second player playing the online game in a player mode differing from the videographer mode, wherein the first player and the at least one player character are matched together, the shared virtual gameplay environment including a virtual space enabling interactions among the plurality of player characters; and
- capture, as the videographer character, one or more of the interactions of the at least one player character among the plurality of player characters in the shared virtual gameplay environment, wherein the one or more of the interactions of the at least one player character are captured from a view associated with the videographer character, wherein the view can be controlled based at least in part on one or more inertia-based inputs received via one or more inertia-based input sensors during the capture.

16. The non-transitory computer readable medium of claim 15, wherein the plurality of player characters includes other videographer characters.

17. The non-transitory computer readable medium of claim 15, wherein capturing of the one or more of the interactions comprises capturing game state information corresponding to at least the one or more of the interactions.

18. The non-transitory computer readable medium of claim 15, wherein the one or more of the interactions include interactions between one or more player characters of the plurality of player characters and one or more virtual objects in the shared virtual gameplay environment.

19. The non-transitory computer readable medium of claim 15, wherein a rendering of the shared virtual gameplay environment during the online game includes rendering an avatar of the videographer character.

20. The non-transitory computer readable medium of claim 19, wherein the one or more inertia-based inputs received during the capture are based on one or more real-world movements detected by the one or more inertia-based input sensors.

* * * * *